United States Patent
Apfelbaum et al.

(10) Patent No.: US 10,671,419 B2
(45) Date of Patent: Jun. 2, 2020

(54) MULTIPLE INPUT-OUTPUT MEMORY MANAGEMENT UNITS WITH FINE GRAINED DEVICE SCOPES FOR VIRTUAL MACHINES

(71) Applicant: Red Hat Israel, Ltd., Ra'anana (IL)

(72) Inventors: Marcel Apfelbaum, Afula (IL); Gal Hammer, Kfar Saba (IL)

(73) Assignee: Red Hat Israel, Ltd., Ra'anana (IL)

( * ) Notice: Subject to any disclaimer, the term of this patent is extended or adjusted under 35 U.S.C. 154(b) by 82 days.

(21) Appl. No.: 15/056,399

(22) Filed: Feb. 29, 2016

(65) Prior Publication Data
US 2017/0249106 A1 Aug. 31, 2017

(51) Int. Cl.
*G06F 9/455* (2018.01)
*G06F 13/40* (2006.01)
(Continued)

(52) U.S. Cl.
CPC ...... *G06F 9/45558* (2013.01); *G06F 12/1081* (2013.01); *G06F 12/1433* (2013.01);
(Continued)

(58) Field of Classification Search
CPC ...... G06F 3/0664; G06F 3/061; G06F 3/0629; G06F 3/067; G06F 3/0673; G06F 9/45558; G06F 12/10; G06F 13/4027; G06F 13/4282; G06F 2009/45579; G06F 2009/45583; G06F 2213/0024; G06F 3/0622; G06F 12/0292; G06F 12/145;
(Continued)

(56) References Cited

U.S. PATENT DOCUMENTS 6,401,140 B1 * 6/2002 Wu .............. G06F 9/4406
710/10
6,704,831 B1 * 3/2004 Avery ............ G06F 13/404
710/310
(Continued)

OTHER PUBLICATIONS

Amit et al., "vIOMMU: Efficient IOMMU Emulation," publication date unknown, 14 pages.
(Continued)

*Primary Examiner* — Mano Padmanabhan
*Assistant Examiner* — Andrew J Cheong
(74) *Attorney, Agent, or Firm* — K&L Gates LLP (57) ABSTRACT

A system and method of emulated input-output memory management units includes a management software associating a first device with a first input-output memory management unit having a first security designation, and associating a second device with a second input-output memory management unit having a second security designation different from the first security designation. A hypervisor constructs a table that describes associations between the plurality of devices and the plurality of input-output memory management units. The hypervisor provides the table to a guest virtual machine having a plurality of guest addresses including a first guest address and a second guest address. The first device accesses the first guest address through the first input-output memory management unit and the second device accesses the second guest address through the second input-output memory management unit.

19 Claims, 5 Drawing Sheets

(51) Int. Cl.
*G06F 13/42* (2006.01)
*G06F 12/1081* (2016.01)
*G06F 12/14* (2006.01)

(52) U.S. Cl.
CPC ...... *G06F 13/4027* (2013.01); *G06F 13/4282* (2013.01); *G06F 2009/45579* (2013.01); *G06F 2212/1016* (2013.01); *G06F 2212/1052* (2013.01); *G06F 2212/151* (2013.01); *G06F 2212/657* (2013.01); *G06F 2213/0024* (2013.01)

(58) Field of Classification Search
CPC ............. G06F 12/1475; G06F 12/1483; G06F 2212/151; G06F 2212/657
See application file for complete search history.

(56) References Cited

U.S. PATENT DOCUMENTS

| | | | |
|---|---|---|---|
| 7,882,330 B2* | 2/2011 | Haertel | G06F 9/45558 711/203 |
| 7,904,692 B2 | 3/2011 | Mukherjee et al. | |
| 8,386,745 B2 | 2/2013 | Kegel et al. | |
| 8,631,170 B2 | 1/2014 | Tsirkin et al. | |
| 8,954,959 B2 | 2/2015 | Tsirkin et al. | |
| 9,436,495 B2* | 9/2016 | Tsirkin | |
| 2003/0115394 A1* | 6/2003 | Kulchytskyy | G06F 9/4411 710/260 |
| 2005/0257246 A1* | 11/2005 | Adams | H04L 63/102 726/1 |
| 2006/0117123 A1* | 6/2006 | Izumida | G06F 9/4411 710/244 |
| 2007/0043882 A1* | 2/2007 | Natarajan | G06F 9/4411 710/8 |
| 2007/0130441 A1* | 6/2007 | Wooten | G06F 12/1027 711/203 |
| 2007/0168636 A1* | 7/2007 | Hummel | G06F 13/404 711/202 |
| 2010/0011147 A1* | 1/2010 | Hummel | G06F 9/45558 711/6 |
| 2010/0279653 A1* | 11/2010 | Poltorak | H04M 15/00 455/410 |
| 2011/0197003 A1* | 8/2011 | Serebrin | G06F 9/45558 710/267 |
| 2011/0202724 A1* | 8/2011 | Kegel | G06F 12/1027 711/118 |
| 2012/0017063 A1* | 1/2012 | Hummel | G06F 12/1081 711/200 |
| 2012/0167082 A1* | 6/2012 | Kumar | G06F 9/4555 718/1 |
| 2012/0206466 A1* | 8/2012 | Sharp | G06T 1/60 345/543 |
| 2012/0272037 A1* | 10/2012 | Bayer | G06F 12/0292 711/202 |
| 2013/0007379 A1* | 1/2013 | Kegel | G06F 21/78 711/154 |
| 2013/0138840 A1* | 5/2013 | Kegel | G06F 13/28 710/22 |
| 2014/0068137 A1 | 3/2014 | Kegel et al. | |
| 2014/0173265 A1* | 6/2014 | Kegel | G06F 21/575 713/2 |
| 2014/0181461 A1* | 6/2014 | Kegel | G06F 12/1009 711/207 |
| 2014/0258700 A1* | 9/2014 | England | G06F 21/572 713/2 |
| 2015/0067296 A1* | 3/2015 | Basu | G06F 12/1009 711/206 |
| 2015/0089184 A1* | 3/2015 | Mukherjee | G06F 12/1036 711/206 |
| 2016/0259735 A1* | 9/2016 | Evans | G06F 12/1036 |
| 2017/0139796 A1* | 5/2017 | He | G06F 11/3027 |
| 2017/0171194 A1* | 6/2017 | Durham | G06F 12/1408 |
| 2017/0185766 A1* | 6/2017 | Narendra Trivedi | G06F 21/53 |
| 2017/0199827 A1* | 7/2017 | Sankaran | G06F 9/45558 |
| 2018/0129616 A1* | 5/2018 | Liang | G06F 3/00 |
| 2018/0253331 A1* | 9/2018 | Sato | G06F 3/06 |

OTHER PUBLICATIONS

Malka, "Rethinking the I/O Memory Management Unit (IOMMU)," Research Thesis, submitted in partial fulfillment of the requirements for the degree of Master of Science in Computer Science, Submitted to the Senate of the Technion—Israel Institute of Technology, Adar 5775, Haifa, Mar. 2015, 121 pages.

Willmann et al., "Protection Strategies for Direct Access to Virtualized I/O Devices," Rice University, [Retrieved from the Internet <URL: https://www.usenix.org/legacy/event/usenix08/tech/full_papers/willmann_html/> on Feb. 4, 2016], 22 pages.

* cited by examiner

MULTIPLE INPUT-OUTPUT MEMORY MANAGEMENT UNITS WITH FINE GRAINED DEVICE SCOPES FOR VIRTUAL MACHINES

BACKGROUND

The present disclosure relates generally to memory management of guest virtual machines and, more particularly, to input-output memory management unit emulation and distribution between virtual devices. Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple guest virtual machines in order to improve the hardware utilization rate.

Virtualization may be achieved by running a software layer, often referred to as a hypervisor, above the hardware and below the guest virtual machines. A hypervisor may run directly on the server hardware without an operating system beneath it or as an application running on a traditional operating system. A hypervisor may virtualize the physical layer and provide interfaces between the underlying hardware and guest virtual machines. Processor virtualization may be implemented by the hypervisor scheduling time slots on one or more physical processors for a guest virtual machine, rather than a guest virtual machine actually having a dedicated physical processor. The present disclosure provides improved systems and methods for input-output memory management unit emulation in a virtual environment.

SUMMARY

The present disclosure provides new and innovative methods and systems for input-output memory management unit emulation. For example, the method includes associating, by a management software, a plurality of devices with a plurality of input-output memory management units. Association includes associating a first device with a first input-output memory management unit having a first security designation. The first device is at least one of a first PCI device and a first PCI bridge. Association further includes associating a second device with a second input-output memory management unit having a second security designation that is different from the first security designation. The second device is at least one of a second PCI device and a second PCI bridge. The hypervisor constructs a table that describes associations between the plurality of devices and the plurality of input-output memory management units. The hypervisor provides the table to a guest virtual machine having a plurality of guest addresses including a first guest address and a second guest address. The first device accesses the first guest address through the first input-output memory management unit, and the second device accesses the second guest address through the second input-output memory management unit.

Additional features and advantages of the disclosed methods and system are described in, and will be apparent from, the following Detailed Description and the Figures.

DETAILED DESCRIPTION OF EXAMPLE EMBODIMENTS

In computer systems executing a guest virtual machine, devices (e.g., peripheral component interconnect (PCI) devices) may access physical memory (e.g., direct memory access) associated with the guest virtual machine. Typically, an input-output memory management unit is enabled to facilitate access between devices and the guest virtual machine. Input-output memory management units may be used in other ways besides access facilitation. For example, input-output memory management units may be used to protect host memory (e.g., RAM) by supplying a mapping of processes used by devices. Also, for example, input-output memory management units may be used to re-map addresses for devices supporting only 32-bit access over 4 GiB memory. The input-output memory management unit has the capability to keep devices from accessing the physical address of particular physical memory (e.g., guest virtual machine protection). Rather, input-output memory management units may provide devices with virtual addresses. The input-output memory management unit may translate the virtual address, accessed by devices, into the physical address of particular physical memory. In this way, if a device is malicious (e.g., a corrupt device) it is unable to access physical memory of the guest virtual machine (e.g., RAM) and subsequently cause problems with the guest virtual machine and/or the host physical memory. For example, the input-output memory management unit may ensure that the guest kernel and guest virtual machine are protected against malicious hardware or buggy drivers.

This translation by the input-output memory management unit, while protecting the guest virtual machine, takes additional processing time. For example, input-output memory management unit implementation and translation may lead to a 15-30% performance penalty for all direct memory access capable PCI devices in the guest virtual machine. Additionally, security concerns are not equal for every device that is attempting to access the guest virtual machine. For example, some devices may be trusted more than other devices. Thus, the scope of guest virtual machine protection should vary. The trusted devices can receive less security (e.g., minimal or none). By having individual (e.g., fine grained) device scopes for input-output memory management units, multiple devices may access a guest virtual machine while optimizing both security and processing efficiency. The present disclosure describes systems and methods of emulating input-output memory management units, such that input-output memory management units may advantageously vary in their security levels on a device-to-device basis.

Figure 1:
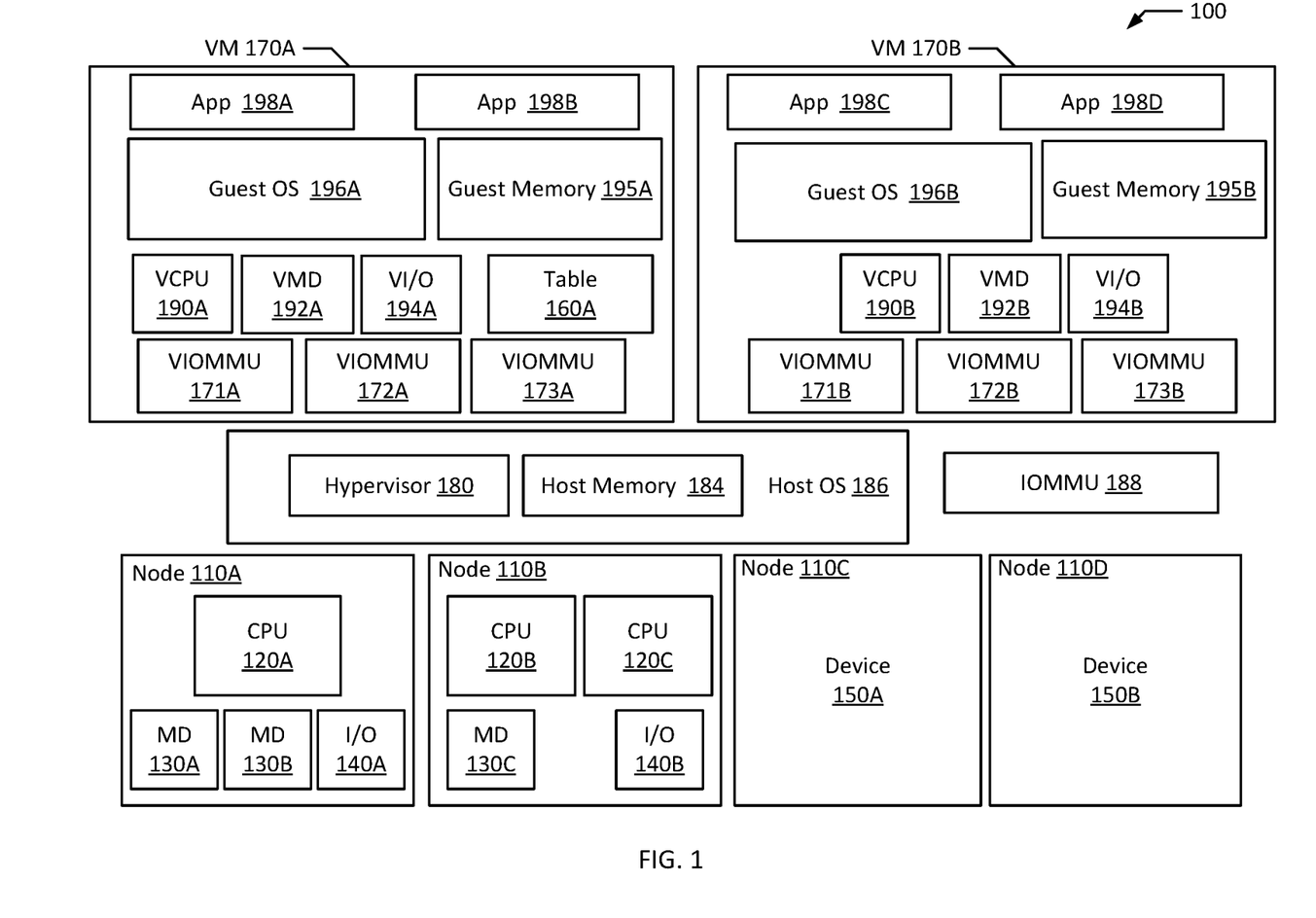
FIG. 1 is a block diagram of an example multi-processor computer system according to an example embodiment of the present disclosure.

FIG. 1 depicts a high-level component diagram of an example multi-processor computer system 100 in accordance with one or more aspects of the present disclosure. The computer system 100 may include one or more interconnected nodes 110A-D. Each node 110A-B may in turn include one or more physical processors (e.g., CPU 120A-C) communicatively coupled to memory devices (e.g., MD 130A-C) and input/output devices (e.g., I/O 140A-B). Each node 110C-D may include a hardware device 150A-B. In an example embodiment, a hardware device (e.g., 150A-B) may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, etc.

As used herein, physical processor or processors 120A-C refer to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example embodiment, a processor may be a single core processor which is typically capable of executing one instruction at a time (or process a single pipeline of instructions), or a multi-core processor which may simultaneously execute multiple instructions. In another example embodiment, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, input/output device 140A-B refers to a device capable of providing an interface between one or more processors and an external device. The external device's operation is based on the processor inputting and/or outputting data.

Processors 120A-C may be interconnected using a variety of techniques, ranging from a point-to-point processor interconnect, to a system area network, such as an Ethernet-based network. Local connections within each node 110A-D, including the connections between a processor 120A and a memory device 130A-B and between a processor 120A and an I/O device 140A, may be provided by one or more local buses of suitable architecture, for example, peripheral component interconnect (PCI). As used herein, a device of the host operating system (host OS) 186 (or host device) may refer to CPU 120A-C, MD 130A-C, I/O 140A-B, a software device, and/or hardware device 150A-B.

As noted above, computer system 100 may run multiple guest virtual machines (e.g., VM 170A-B), by executing a software layer (e.g., hypervisor 180) above the hardware and below the guest virtual machines 170A-B, as schematically shown in FIG. 1. In an example embodiment, the hypervisor 180 may be a component of the host operating system 186 executed by the computer system 100. In another example embodiment, the hypervisor 180 may be provided by an application running on the host operating system 186, or may run directly on the computer system 100 without an operating system beneath it. The hypervisor 180 may virtualize the physical layer, including processors, memory, and I/O devices, and present this virtualization to guest virtual machines 170A-B as devices, including virtual processors (e.g., VCPU 190A-B), virtual memory devices (e.g., VMD 192A-B), and/or virtual I/O devices (e.g., VI/O 194A-B). A guest virtual machine 170A-B may run on any type of dependent, independent, compatible, and/or incompatible applications on the underlying hardware and OS 186. In an example embodiment, applications (e.g., App 198A-D) run on a guest virtual machine 170A-B may be dependent on the underlying hardware and/or OS 186. In another example embodiment, applications 196A-D run on a guest virtual machine 170A-B may be independent of the underlying hardware and/or OS 186. For example, applications 198A-B run on a first guest virtual machine 170A may be dependent on the underlying hardware and/or OS 186 while applications 198C-D run on a second guest virtual machine 170B are independent of the underlying hardware and/or OS 186. Additionally, applications 198A-D run on a guest virtual machine 170A-B may be compatible with the underlying hardware and/or OS 186. In an example embodiment, applications 198A-D run on a guest virtual machine 170A-B may be incompatible with the underlying hardware and/or OS 186. For example, applications 198A-B run on one guest virtual machine 170A may be compatible with the underlying hardware and/or OS 186 while applications 198C-D run on another guest virtual machine 170B are incompatible with the underlying hardware and/or OS 186. In an example embodiment, a device may be implemented as a guest virtual machine 170.

In an example embodiment, a guest virtual machine 170A-B may execute a guest operating system (guest OS) 196A-B which may utilize the underlying VCPU 190A-B, VMD 192A-B, and VI/O devices 194A-B. One or more applications 198A-D may be running on a guest virtual machine 170A-B under the guest operating system 196A-B. In an example embodiment, a guest virtual machine 170A-B may include multiple virtual processors 190A-B. Processor virtualization may be implemented by the hypervisor 180 scheduling time slots on one or more physical processors 120A-C such that from the guest operating system's perspective those time slots are scheduled on a virtual processor 190A-B.

The hypervisor 180 controls and limits access to memory (e.g., memory allocated to the guest virtual machines 170A-B and memory allocated to the guest operating systems 196A-B, such as guest memory 195A-B provided to guest operating systems 196A-B, etc.). For example, guest memory 195A-B may be divided into a plurality of memory pages. Access to these memory pages is controlled and limited by the hypervisor 180. Likewise, for example, guest memory 195A-B allocated to the guest operating system 196A-B are mapped from host memory 184 such that when a guest application 198A-D or a device (e.g., device 150A) uses or accesses a memory page of guest memory 195A-B it is actually using or accessing host memory 184. Host memory 184 is also referred to as host physical memory 184, as it physically exists on a computer system (e.g., system 100).

The hypervisor 180 may keep track of how each memory page is mapped, allocated, accessed, and/or used through the use of the input-output memory management unit (IOMMU) 188. An IOMMU may map virtual addresses to physical addresses. In an example embodiment, an IOMMU may be implemented on a host in physical hardware. Also, in an example embodiment, an IOMMU may be emulated on a guest virtual machine, in which case, the emulated IOMMU may map guest virtual addresses to guest physical addresses. For example, the IOMMU 188 maps the device address space (e.g., a bus address) that is relevant to the I/O bus into the physical address space (e.g., a host physical address). The IOMMU 188 may also include extra information associated with the address space mapping, such as read and write permissions. For example, mappings in the IOMMU 188 allow a device (e.g., device 150A) to access a particular address (e.g., a physical address or a virtual address). In an example embodiment, the particular address is a guest address (e.g., guest address, guest virtual address, etc.). In a different example embodiment, the particular address is a physical address (e.g., host physical address, guest physical address, etc.). Likewise, for example, mappings can be removed to prevent direct access, by the device, to the particular address. The mechanism of mapping and unmapping an address allows a host, through a hypervisor 180, to control access to a particular host address in host memory 184. For example, the IOMMU 188 may implement various levels of security (e.g., standard translation, one-to-one translation, disabled translation, etc.) for particular devices (e.g., device 150A-B). As a result, the host can maintain memory integrity by preventing a device from performing illegal transactions or accessing invalid addresses.

In this manner, the hypervisor 180, through the IOMMU 188, can prevent memory allocated to one guest OS 196A from being inappropriately accessed and/or modified by another guest OS 196B or the host OS 186. Accesses are detected by the guest OS (e.g., 196A) in the guest virtual machine (e.g., VM 170A), which may act as an interface between a host OS (e.g., 186) and the guest OS (e.g., 196A). Similarly, the hypervisor 180, through the IOMMU 188, can prevent memory assigned to or being used by one application 198A from being used by another application 198B. Additionally, the hypervisor 180, through the IOMMU 188, can prevent memory accessible by one node (e.g., 110A) from being used by another node (e.g., 110B). In an example embodiment, the IOMMU 188 is a hardware component that is separate from the VMs 170A-B, nodes 110A-D, the host OS 186, and the hypervisor 180. In a different example embodiment, the IOMMU 188 is emulated, such that it is included within the host OS 186 and/or the VMs 170A-B, and used by the guest OS 196A-B to communicate with the hypervisor 180. For example, VM 170A may include emulated IOMMUs, also referred to as VIOMMUs 171A-173A. Also, for example, VM 170B may include VIOMMUs 171B-173B. In an example embodiment, VIOMMUs are pure stand-alone software constructs that may operate with no interaction with the IOMMU 188, or operate on a system without a host physical IOMMU.

Mappings to memory, stored in the IOMMU 188, are accessible by the hypervisor 180, the VMs 170A-B and each node 110A-D. Through these mappings, the memory itself can be accessed. Likewise, mappings may be used together with any paging data structure used by the VMs 170A-B to support translation from guest OS 196A-B to host OS 186 addresses (e.g., 32-bit linear address space using a two-level hierarchical paging structure, Physical Address Extension mode, INTEL® Extended Memory 64 Technology mode, etc.).

In an example embodiment, virtual machines (e.g., VM 170A) may further include a table 160A. The table 160A may describe associations between the plurality of devices (e.g., first device 150A and second device 150B) and a plurality of emulated IOMMUs or VIOMMUs. For example, the table 160A may include associations with a plurality of VIOMMUs such as a first VIOMMU 171A, a second VIOMMU 172A, a third VIOMMU 173A, a fourth VIOMMU 171B, a fifth VIOMMU 172B, a sixth VIOMMU 173B, etc. In an example embodiment, emulation involves distributing several IOMMUs (e.g., VIOMMUs) between several devices (e.g., devices 150A-B, virtual devices VI/O 194A-B, etc.) such that each distributed VIOMMU may have single-device scope. Emulation of IOMMUs is discussed in greater detail below with reference to FIG. 3.

The table 160A may further include information on each of the VIOMMUs (e.g., the first VIOMMU 171A, the second VIOMMU 172A, the third VIOMMU 173A, etc.). In an example embodiment, the table 160A may reside on other virtual machines (e.g., VM 170B). In an example embodiment, the table 160A is an advanced configuration and power interface table (ACPI table). The table 160A, and its relation to the hypervisor 180, virtual machine 170A, and additional components, is discussed in greater detail below with reference to FIGS. 4-5.

Figure 2:
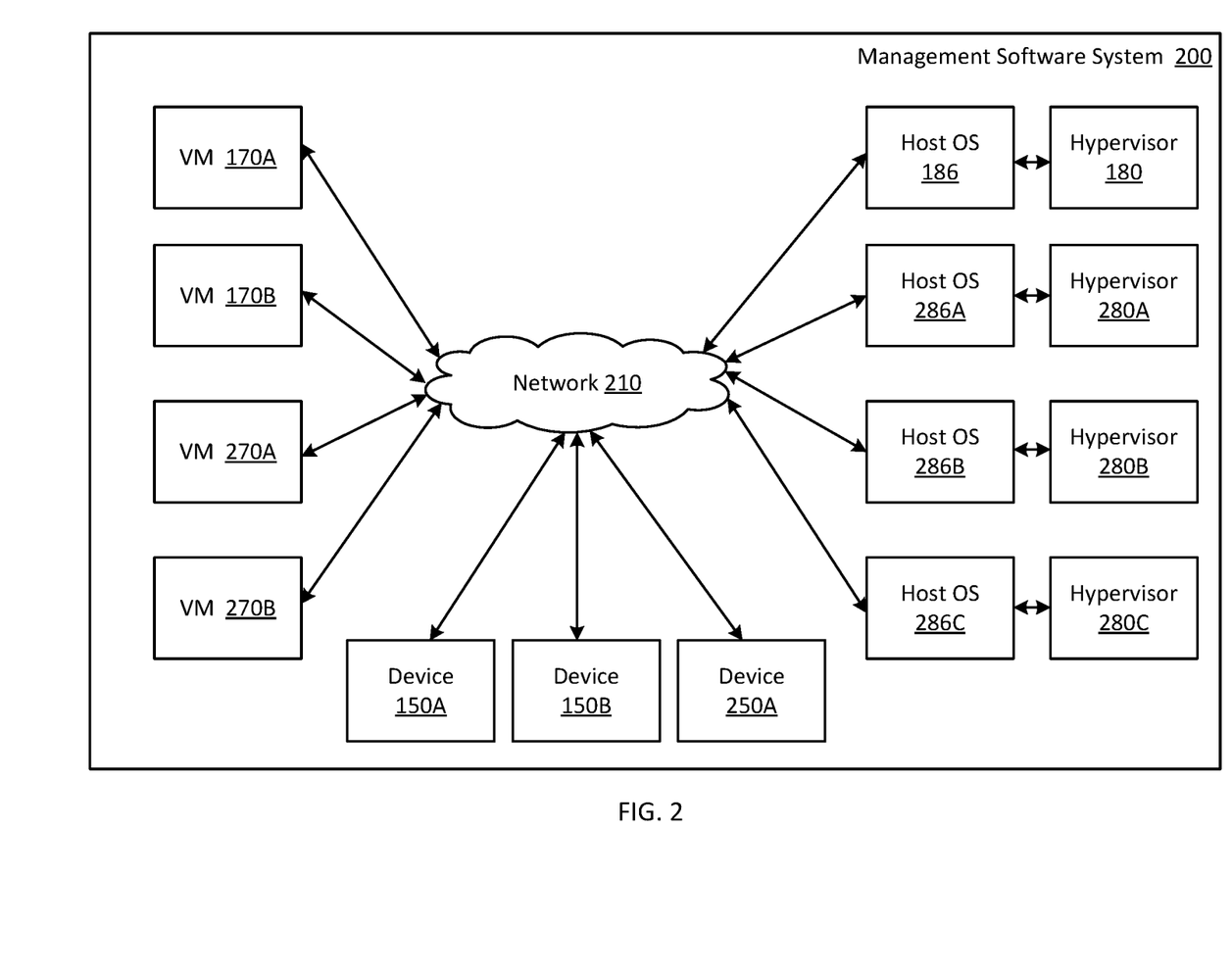
FIG. 2 is a block diagram of an example management software system according to an example embodiment of the present disclosure.

FIG. 2 is a block diagram of an example management software system according to an example embodiment of the present disclosure. The management software system 200 may provide access to one or more guest virtual machines including VMs 170A-B (as described above). The management software system 200 may provide access to additional VMs 270A-B. Each of the VMs 170A-B and the additional VMs 270A-B may be connected to a network 210. In an example embodiment, the network 210 is a local area network. In a different example embodiment, the network 210 is an external network (e.g., the Internet).

The management software 200 may also provide access to one or more host operating systems including host OS 186 (as described above). The management software system 200 may provide access to additional host OSs 286A-C. Each of the host OS 186 and additional host OSs 286A-C may be connected to the network 210. Each of the host OS 186 and the additional host OSs 286A-C may be associated with a hypervisor. For example, host OS 186 may be associated with hypervisor 180 (as described above). Each of the additional host OSs 286A-C may be associated with hypervisors 280A-C respectively.

In an example embodiment, a user may interact with the management software system 200 to select at least one guest virtual machine (e.g., VM 170A) and at least one host operating system (e.g., host OS 186 and hypervisor 180) to emulate a virtual environment (e.g., computer system 100). In a different example embodiment, the user may interact with the management software system 200 to select more than one guest virtual machine (e.g., VM 170A-B) and at least one host operating system (e.g., host OS 186 and hypervisor 180) to emulate a virtual environment.

The management software 200 may also provide access to one or more devices including devices 150A-B (as described above) and at least one additional device 250A. Each of the devices 150A-B and additional device 250A may be connected to the network 210. Each of the devices 150A-B and additional device 250A may be selected, by the user, and subsequently associated with one or more guest virtual machines including VMs 170A-B and additional VMs 270A-B and one of host OS 186 and additional host OSs 286A-C. Thus, particular devices (e.g., device 150A and device 150B) are associated with a particular virtual environment (e.g., guest virtual machine 170A, host OS 186, and hypervisor 180). Once the virtual environment has been emulated, the IOMMUs for the virtual environment may be emulated (e.g., first VIOMMU 171A, second VIOMMU 172A, third VIOMMU 173A) and scoped on a device-by-device basis.

Figure 3A:
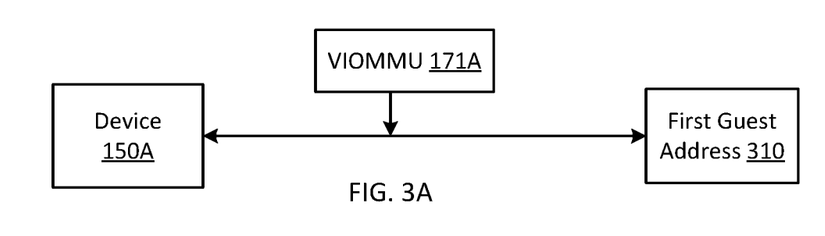
FIGS. 3A-C are block diagrams of example security designations with input-output memory management unit emulation according to an example embodiment of the present disclosure.
Figure 3B:
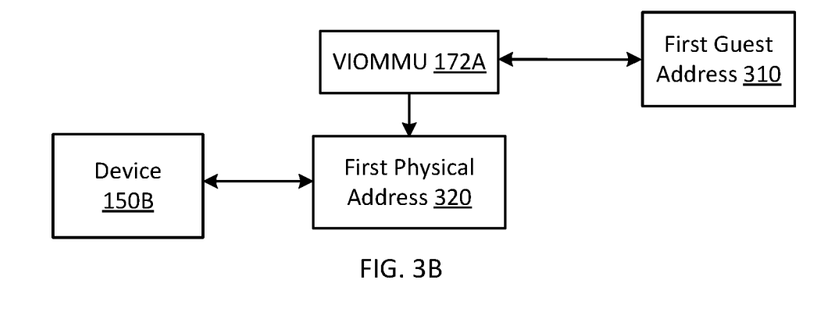
Figure 3C:
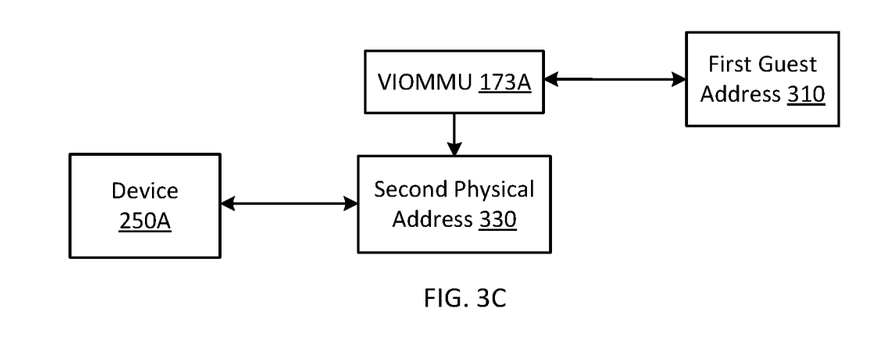

FIGS. 3A-C are block diagrams of example security designations with input-output memory management unit emulation according to an example embodiment of the present disclosure. In an example embodiment, three typical security designations are disabled translation, one-to-one translation, and standard translation. Each of these different security designations affords the associated device and guest virtual machine with a different scope of protection. As illustrated in FIGS. 3A-C, the IOMMUs may be emulated into a plurality of VIOMMUs 171A-173A. Each of the plurality of VIOMMUs 171A-173A (e.g., first VIOMMU 171A, second VIOMMU 172A and third VIOMMU 173A) may have a different security designation and may be associated with a different device. Emulated IOMMUs (e.g., first VIOMMU 171A), while associated with a hardware device (e.g., device 150A), may only interact with the virtual machine I/O device (e.g., VI/O 194A) associated with the device. For example, though VIOMMU 171A may be associated with device 150A graphically in FIG. 3A, it may actually be interacting with VI/O 194A, which may be a virtual emulation of physical device 150A.

FIG. 3A illustrates a first VIOMMU 171A with a first security designation. For example, the first security designation is disabled translation. When the first security designation is disabled translation, the first VIOMMU 171A links a first guest address 310 directly to the first device 150A. In an example embodiment, the first VIOMMU 171A links the first guest address 310 to VI/O 194A, which may be associated with device 150A. For example, the first device 150A accesses the first guest address 310 directly; no translation is required by the first VIOMMU 171A. Guest addresses (e.g., first guest address 310) may be guest addresses or guest virtual addresses. In a related example, with disabled translation, the first device 150A accesses the first guest address 310 directly without going through the first partitioned VIOMMU 171A. In an example embodiment, the first security designation of disabled translation provides for minimal security protection and maximum processing speed.

FIG. 3B illustrates a second VIOMMU 172A with a second security designation. For example, the second security designation is one-to-one translation. When the second security designation is one-to-one translation, the second VIOMMU 172A links the first guest address 310 to a first physical address 320. Physical addresses (e.g., first physical address 320) may be host physical addresses or guest physical addresses. In an example embodiment, one-to-one translation means the IOMMU (e.g., second VIOMMU 172A) translates, by default, the physical address to the same physical address. Advantageously, this translation may be manually changed (e.g., first physical address 320 may change) for a specific device (e.g., virtual device VI/O 194A, physical device 150B, etc.). By mapping the first guest address 310 to the first physical address 320, guest memory is protected. Typically, one-to-one translation is used for applications that know, in advance, how much memory will be required. In an example embodiment, the second security designation of one-to-one translation provides for intermediate security protection (e.g., more security protection than the first security designation) and intermediate processing speed (e.g., slower processing speed than the first security designation).

FIG. 3C illustrates a third VIOMMU 173A with a third security designation. For example, the third security designation is standard translation. When the third security designation is standard translation, the third VIOMMU 173A links the first guest address 310 to a second physical address 330. The first guest address 310 and the second physical address 330 have different address locations. For example, a third device 250A accesses the second physical address 330. The second physical address 330 is a different address location than the first guest address 310. Thus, the third VIOMMU 173A must translate the second physical address 330 into the first guest address 310, such that the third device 250A may access the first guest address 310. In an example embodiment, the third security designation of standard translation provides for maximum security protection (e.g., more security protection than the second security designation), with a relatively minimum processing speed (e.g., slower processing speed than the second security designation).

Figure 4:
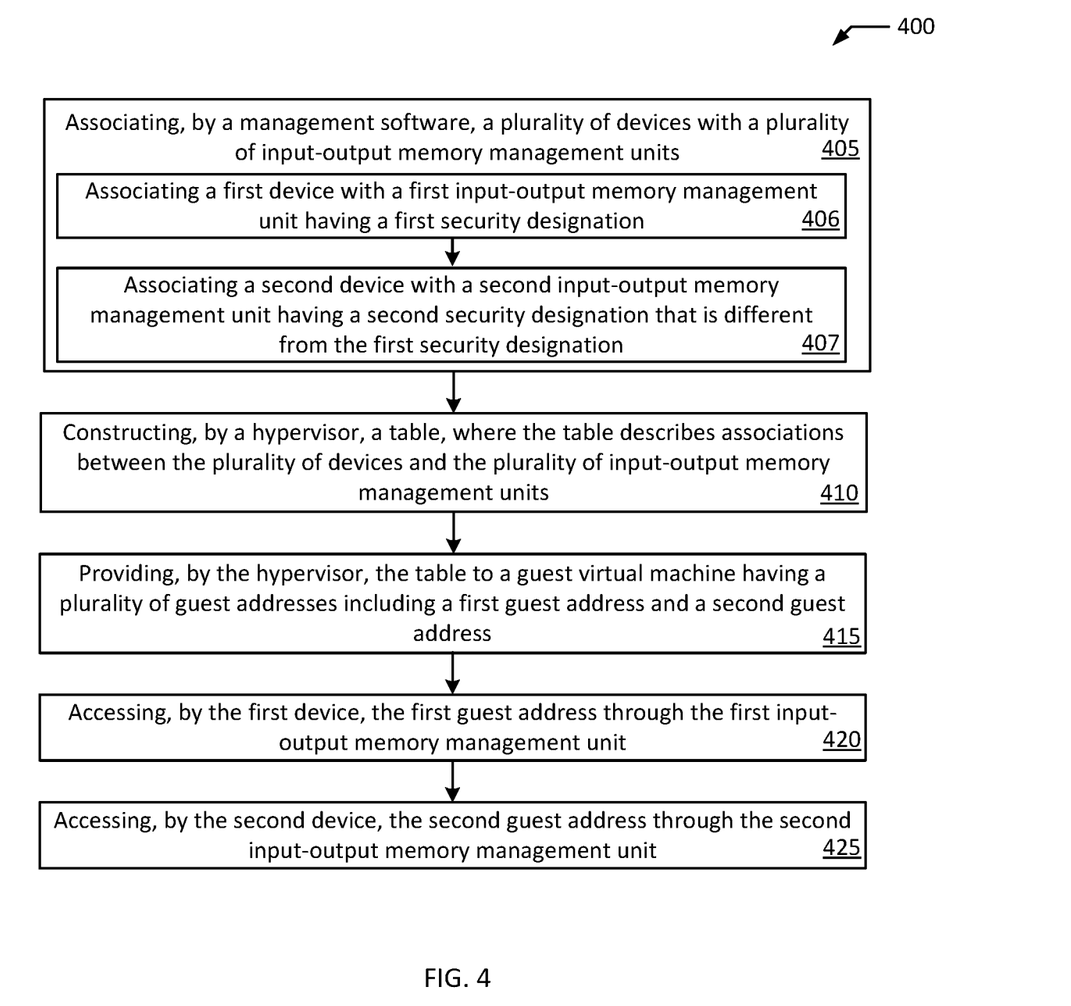
FIG. 4 is a flowchart illustrating an example method of input-output memory management unit emulation according to an example embodiment of the present disclosure.

FIG. 4 is a flowchart illustrating an example method of input-output memory management unit emulation according to an example embodiment of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may include hardware (circuitry, dedicated logic, etc.), software, or a combination of both. In an example embodiment, the method is performed by a hypervisor 180 interacting with a management software system 200, and devices 150A-B. In other example embodiments, the method is performed by other memory systems (e.g., computer system 100, an external computer system, etc.).

The example method 400 starts with a management software associating a plurality of devices with a plurality of input-output memory management units (block 405). For example, management software system 200 may associate devices 150A-B with first VIOMMU 171A and second VIOMMU 172A. This association includes associating a first device 150A with a first IOMMU having a first security designation (e.g., one-to-one translation) (block 406). In an example embodiment, the first device 150A is associated with the first VIOMMU 171A, which includes receiving a first device selection from a user. The first device selection is a selection of the first device 150A from the plurality of devices (e.g., devices 150A-B). Association further includes receiving a first IOMMU selection from the user, where the first IOMMU selection is a selection of the first VIOMMU 171A from the plurality of IOMMUs (e.g., IOMMUs 171A-173A). In an example embodiment, associating the first device 150A with the first VIOMMU 171A further includes receiving the first security designation defining a relationship between the first VIOMMU 171A and the first device 150A. In an example embodiment, the first device 150A is at least one of a first PCI device and a first PCI bridge. For example, a PCI device may typically be a peripheral component interconnect device that may require direct memory access. Also, for example, a PCI bridge may typically be provided as a software bridge to multiple PCI devices.

This association further includes associating a second device 150B with a second IOMMU having a second security designation that is different from the first security designation (block 407). For example, the second security designation may be standard translation and the first security designation may be one-to-one translation. In an example embodiment associating the second device 150B with the second VIOMMU 172A further includes receiving a second device selection from the user, where the second device selection is a selection of the second device 150B from the plurality of devices (e.g., devices 150A-B), and receiving a second IOMMU selection from the user, where second the input-output memory management unit selection is a selection of the second VIOMMU 172A from the plurality of VIOMMUs (e.g., VIOMMUs 171A-173A). In an example embodiment, associating the second device 150B with the second VIOMMU 172A further includes receiving the second security designation defining a relationship between the second VIOMMU 172A and the second device 150B. In an example embodiment, the second device 150B is at least one of a second PCI device and a second PCI bridge.

The method 400 further includes constructing, by a hypervisor 180, a table 160A (block 410). The table 160A describes associations between the plurality of devices 150A-B and the plurality of IOMMUs (e.g., VIOMMUs 171A-172A). The hypervisor 180 may then provide the table 160A to a guest virtual machine (e.g., first guest virtual machine 170A) having a plurality of guest addresses including a first guest address and a second guest address (block 415). For example, the first guest address may be 0100 and the second guest address may be 3FF0. In an example embodiment, the first guest address (e.g., 0100) may be a guest virtual address and the second guest address (e.g., 3FF0) may be a guest physical address. The first device 150A may access the first guest address through the first IOMMU (block 420). For example, the first VIOMMU 171A may have the first security designation of one-to-one translation, such that the first VIOMMU 171A links the first guest virtual address (e.g., address 0100) with a first guest physical address (e.g., 0100) at the same address location. Likewise, the second device 150B may access the second guest address through the second IOMMU (block 425). For example, the second VIOMMU 172A may have the second security designation of standard translation, such that the second VIOMMU 172A links the second guest virtual address (e.g., address 3FF0) with a second guest physical address (e.g., A7F0) at a different address location.

Figure 5:
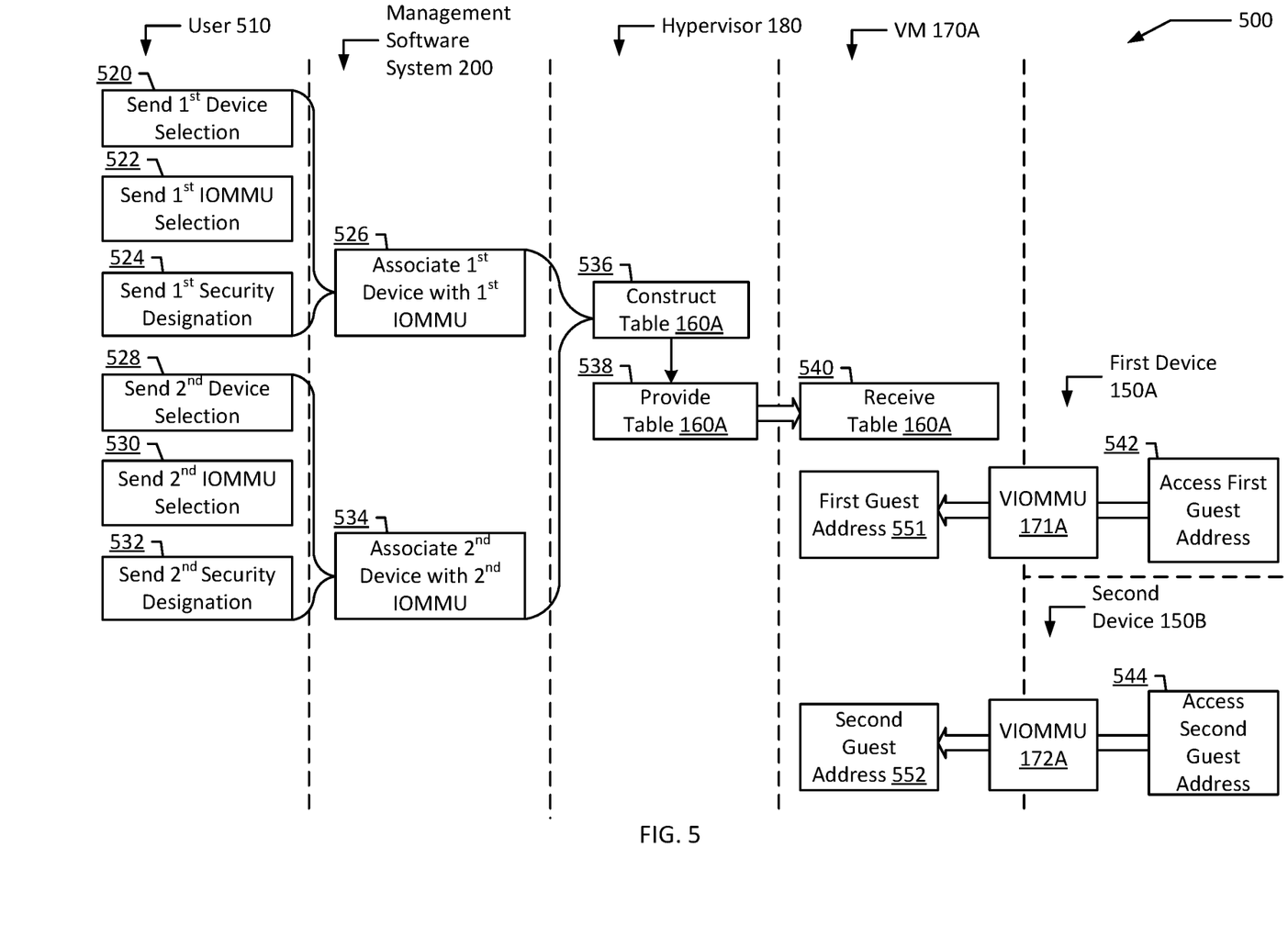
FIG. 5 is a flow diagram illustrating input-output memory management unit emulation according to an example embodiment of the present disclosure.

FIG. 5 is a flow diagram illustrating an example method of input-output memory management unit emulation according to an example embodiment of the present disclosure. Although the example method 500 is described with reference to the flowchart illustrated in FIG. 5, it will be appreciated that many other methods of performing the acts associated with the method may be used. For example, the order of some of the blocks may be changed, certain blocks may be combined with other blocks, and some of the blocks described are optional. The method 500 may be performed by processing logic that may include hardware (circuitry, dedicated logic, etc.), software, or a combination of both.

In the illustrated example embodiment in FIG. 5, a user 510 sends, from a client device (e.g. desktop, mobile device, laptop, etc.), a first device selection (e.g., a selection of first device 150A) to a management software system 200 (block 520). The user 510 sends, from the client device, a first IOMMU selection (e.g., a selection of first VIOMMU 171A) to the management software system 200 (block 522). The user 510 sends, from the client device, a first security designation (e.g., a selection of one-to-one translation) to the management software system 200 (block 524). The management software system 200 associates the first device 150A with the first VIOMMU 171A (block 526).

A user 510 further sends, from the client device, a second device selection (e.g., a selection of second device 150B) to a management software system 200 (block 528). The user 510 sends, from the client device, a second IOMMU selection (e.g., a selection of second VIOMMU 172A) to the management software system 200 (block 530). The user 510 sends, from the client device, a second security designation (e.g., a selection of standard translation) to the management software system 200 (block 532). The management software system 200 associates the second device 150B with the second VIOMMU 172A (block 534).

In an example embodiment, the device selection (e.g., first device selection) and the IOMMU selection (e.g., first IOMMU selection) are entered, by the user 510, using the management software system 200 and/or a client device networked with the management software system 200. For example, the user 510 may enter selections through a command line generated by the management software system 200 and/or a client device networked with the management software system 200. Also, for example, the user 510 is prompted, by a graphical user interface of the management software system 200, to enter selections. The management software system may generate the graphical user interface, and may indicate the device selections (e.g., first device selection) and the IOMMU selections (e.g., first IOMMU selection) that the user 510 makes.

In an example embodiment, associating the plurality of devices with the plurality of input-output memory management units, as discussed above in relation to blocks 526 and 534, further includes associating a third device (e.g., device 250A) with a third VIOMMU (e.g., IOMMU 173A). The third device 250A is at least one of a third PCI device and a third PCI bridge. Likewise, in an example embodiment, associating the plurality of devices with the plurality of input-output memory management units further includes associating a fourth device with the third VIOMMU 173A. The fourth device is at least one of a third PCI device and a third PCI bridge. For example, both the third device 250A and the fourth device are associated with the third VIOMMU 173A. In another example embodiment, associating the plurality of devices with the plurality of input-output memory management units further includes associating a fifth device with none of the plurality of input-output memory management units. For example, the fifth device has no association with any of the plurality of input-output memory management units.

The hypervisor 180 constructs a table 160A (block 536). The table 160A describes associations between the plurality of devices (e.g., first device 150A and second device 150B) and the plurality of input-output memory management units (e.g., first VIOMMU 173A and second VIOMMU 172A). The table 160A may include additional information such as a first security designation and second security designation. In an example embodiment, the table 160A is an advanced configuration and power interface table (ACPI table). The hypervisor 180 provides the table 160A to a guest virtual machine 170A (block 538). The guest virtual machine 170A receives the table 160A (block 540). In an example embodiment, the hypervisor 180 is an open source machine emulator.

Once the table 160A has been received by the guest virtual machine 170A, access attempts (e.g., direct memory access attempts) by devices (e.g., first device 150A and second device 150B) will be channeled through respectively VIOMMUs (e.g., first VIOMMU 171A and second VIOMMU 172A).

More particularly, a first device 150A accesses a first guest address 551 (e.g., a first guest virtual address) on the first guest virtual machine 170A (block 542). In an example embodiment, the device accessing the first guest address 551 is a virtual device (e.g., VI/O 194A). Access to the first guest address 551 is made through the first VIOMMU 171A. In an example embodiment, the first VIOMMU 171A has a first security designation of one-to-one translation; thus, the first VIOMMU 171A performs one-to-one translation when the first device 150A accesses the first guest address 551. For example, when the first security designation is one-to-one translation, the first VIOMMU 171A links the first guest address 551 to a first physical address. The first guest address 551 and the first physical address have the same address location (e.g., 0100). For example, a first device 150A accesses the first physical address, which is linked to the first guest address 551. The first VIOMMU 171A provides the linked access, such that the first device 150A may access the first guest address 551 by accessing the first physical address. However, no address translation is necessary because the first guest address 551 and the first physical address have the same address location.

A second device 150B accesses a second guest address 552 (e.g., a second guest virtual address) on the first guest virtual machine 170A (block 544). In an example embodiment, the device accessing the first guest address 551 is a virtual device. Access to the second guest address 552 is made through the second VIOMMU 172A. In an example embodiment, the second VIOMMU 172A has a second security designation of standard translation; thus, the second VIOMMU 172A performs standard translation when the second device 150B accesses the second guest address 552. For example, when the second security designation is standard translation, the second VIOMMU 172A links the second guest address 552 to a second physical address. The second guest address 552 and the second physical address have different address locations (e.g., 3FF0 and A7F0). For example, a second device 150B accesses the second physical address. The second physical address (e.g., A7F0) is a different address location than the second guest address 552 (e.g., 3FF0). Thus, the second VIOMMU 172A must translate the second physical address into the second guest address 552, such that the second device 150B may access the second guest address 552. Accordingly, the presently described systems and methods of IOMMU emulation provide elasticity and flexibility as devices are associated with IOMMUs and security designations.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of input-output memory management unit (IOMMU) emulation, the method comprising:
    associating, by a management software, a plurality of external hardware devices with a plurality of virtual IOMMUs, including:
        uniquely associating a first hardware device with a first IOMMU having a first security designation, the first security designation defining a first protection relationship between the first IOMMU and the first hardware device, wherein the first hardware device is at least one of a first PCI device and a first PCI bridge, and wherein the first IOMMU has only single-device scope limited to the first hardware device; and
        uniquely associating a second hardware device, which is different from the first hardware device, with a second IOMMU having a second security designation that is different from the first security designation, the second security designation defining a second protection relationship between the second IOMMU and the second hardware device, wherein the second hardware device is at least one of a second PCI device and a second PCI bridge, and wherein the second IOMMU has only single-device scope limited to the second hardware device;
    constructing, by a hypervisor, a table, wherein the table describes associations between the plurality of external hardware devices and the plurality of virtual IOMMUs;
    providing, by the hypervisor, the table to a guest virtual machine having a plurality of guest addresses including a first guest address and a second guest address;
    accessing, by the first hardware device, the first guest address through the first IOMMU as dictated by the first security designation; and
    accessing, by the second hardware device, the second guest address through the second IOMMU as dictated by the second security designation.

2. The method of claim 1, wherein associating the plurality of external hardware devices with the plurality of virtual IOMMUs further includes:
    uniquely associating a third hardware device, which is different from the first hardware device and the second hardware device, with a third IOMMU, wherein the third hardware device is at least one of a third PCI device and a third PCI bridge, and wherein the third IOMMU has only single-device scope limited to the third hardware device; and
    uniquely associating a fourth hardware device, which is different from the first hardware device, the second hardware device, and the third hardware device, with the third IOMMU, wherein the fourth hardware device is at least one of a fourth PCI device and a fourth PCI bridge, and wherein the fourth IOMMU has only single-device scope limited to the fourth hardware device.

3. The method of claim 1, wherein associating the plurality of external hardware devices with the plurality of virtual IOMMUs further includes:
    associating a fifth hardware device, which is different from the first hardware device and the second hardware device, with none of the plurality of virtual IOMMUs.

4. The method of claim 1, wherein associating the first hardware device with the first IOMMU includes:
    receiving a device selection from a user, wherein the device selection is a selection of the first hardware device from the plurality of external hardware devices; and
    receiving an IOMMU selection from the user, wherein the IOMMU selection is the selection of the first IOMMU from the plurality of virtual IOMMUs.

5. The method of claim 4, wherein associating the first hardware device with the first IOMMU further includes:

receiving the first security designation, wherein the first security designation defines the first protection relationship between the first IOMMU and the first hardware device; and configuring the first IOMMU in response to the first security designation.

6. The method of claim 5, wherein the first security designation is one of disabled translation, one-to-one translation, and standard translation.

7. The method of claim 6, wherein responsive to the first security designation being disabled translation, the first IOMMU links the first guest address directly to the first hardware device.

8. The method of claim 6, wherein responsive to the first security designation being one-to-one translation, the first IOMMU links the first guest address to a physical address, wherein the first guest address and the physical address have a same address location.

9. The method of claim 8, wherein the physical address is manually changed.

10. The method of claim 6, wherein responsive to the first security designation being standard translation, the first IOMMU links the first guest address to a physical address, wherein the first guest address and the physical address have different address locations.

11. The method of claim 4, wherein the device selection and the IOMMU selection are entered, by the user, using the management software.

12. The method of claim 1, wherein the table is an advanced configuration and power interface table.

13. A system of input-output memory management unit (IOMMU) emulation, the system comprising:
a memory;
one or more processors, in communication with the memory;
a guest virtual machine having a plurality of guest addresses including a first guest address and a second guest address, configured to execute on the one or more processors;
a plurality of external hardware devices in communication with the one or more processors, including at least a first hardware device and a second hardware device, wherein the second hardware device is different from the first hardware device;
a plurality of virtual IOMMUs including a first IOMMU having a first security designation, the first security designation defining a first protection relationship between the first IOMMU and the first hardware device, and a second IOMMU having a second security designation that is different from the first security designation, the second security designation defining a second protection relationship between the second IOMMU and the second hardware device, configured to execute on the one or more processors;
a management software, configured to execute on the one or more processors, to:
uniquely associate the first hardware device with the first IOMMU, wherein the first hardware device is at least one of a first PCI device and a first PCI bridge, and wherein the first IOMMU has only single-device scope limited to the first hardware device; and
uniquely associate the second hardware device with the second IOMMU, wherein the second hardware device is at least one of a second PCI device and a second PCI bridge, and wherein the second IOMMU has only single-device scope limited to the second hardware device; and a hypervisor, configured to execute on the one or more processors, to:
construct a table, wherein the table describes associations between the plurality of external hardware devices and the plurality of virtual IOMMUs; and
provide the table to the guest virtual machine,
wherein the first hardware device accesses the first guest address through the first IOMMU as dictated by the first security designation, and
wherein the second hardware device accesses the second guest address through the second IOMMU as dictated by the second security designation.

14. The system of claim 13, wherein the first security designation defines the first protection relationship between the first IOMMU and the first hardware device.

15. The system of claim 14, wherein the first security designation is one of disabled translation, one-to-one translation, and standard translation.

16. The system of claim 15, wherein responsive to the first security designation being disabled translation, the first IOMMU links the first guest address directly to the first hardware device.

17. The system of claim 15, wherein responsive to the first security designation being one-to-one translation, the first IOMMU links the first guest address to a physical address, wherein the first guest address and the physical address have a same address location, and wherein the physical address is manually changed.

18. The system of claim 15, wherein responsive to the first security designation being standard translation, the first IOMMU links the first guest address to a physical address, wherein the first guest address and the physical address have different address locations.

19. A computer-readable non-transitory storage medium comprising executable instructions that, when executed, are configured to cause a hypervisor to:
construct, a table, wherein the table describes associations between a plurality of external hardware devices and a plurality of virtual input-output memory management units (IOMMUs), including:
uniquely associating a first hardware device with a first IOMMU having a first security designation, the first security designation defining a first protection relationship between the first IOMMU and the first hardware device, wherein the first hardware device is at least one of a first PCI device and a first PCI bridge, and wherein the first IOMMU has only single-device scope limited to the first hardware device; and
uniquely associating a second hardware device, which is different from the first hardware device, with a second IOMMU having a second security designation that is different from the first security designation, the second security designation defining a second protection relationship between the second IOMMU and the second hardware device, wherein the second hardware device is at least one of a second PCI device and a second PCI bridge, and wherein the second IOMMU has only single-device scope limited to the second hardware device; and
provide the table to a guest virtual machine having a plurality of guest addresses including a first guest address and a second guest address,
wherein the first hardware device accesses the first guest address through the first IOMMU as dictated by the first security designation, and wherein the second hardware device accesses the second guest address through the second IOMMU as dictated by the second security designation.

\* \* \* \* \*